US012544775B2

(12) United States Patent
Schroer et al.

(10) Patent No.: US 12,544,775 B2
(45) Date of Patent: Feb. 10, 2026

(54) DISPENSING NOZZLE HAVING A TUBULAR EXIT ZONE COMPRISING VANES

(71) Applicant: DDP SPECIALTY ELECTRONIC MATERIALS US, LLC, Wilmington, DE (US)

(72) Inventors: Daniel Schroer, Saginaw, MI (US); Joseph Langmaid, Caro, MI (US); Mark Rickard, Midland, MI (US); Piyush Soni, Midland, MI (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 18 days.

(21) Appl. No.: 17/518,034

(22) Filed: Nov. 3, 2021

(65) Prior Publication Data

US 2022/0168761 A1 Jun. 2, 2022

Related U.S. Application Data

(60) Provisional application No. 63/120,521, filed on Dec. 2, 2020.

(51) Int. Cl.
*B05B 7/00* (2006.01)
*B05B 1/34* (2006.01)
(Continued)

(52) U.S. Cl.
CPC .......... *B05B 7/0068* (2013.01); *B05B 7/0043* (2013.01); *B05B 7/28* (2013.01);
(Continued)

(58) Field of Classification Search
CPC ....... B05B 7/0068; B05B 7/0043; B05B 7/28; B05B 1/3402; B05B 7/0408; B05D 1/02; B29B 7/7419
(Continued)

(56) References Cited

U.S. PATENT DOCUMENTS

| | | | | |
|---|---|---|---|---|
| 3,963,178 A * | 6/1976 | Collins | B05B 7/10 | 239/405 |
| 4,277,030 A * | 7/1981 | Hechler, IV | B05B 7/2443 | 239/443 |

(Continued)

FOREIGN PATENT DOCUMENTS

| | | | |
|---|---|---|---|
| CN | 110237953 A * | 9/2019 | B05B 7/0408 |
| DE | 102016221729 A1 | 5/2018 | |

(Continued)

OTHER PUBLICATIONS

PCT International Search Report for Application No. PCT/US2021/057848; Volker Lindner, Authorized Officer; ISA/EPO; Mar. 9, 2022.

*Primary Examiner* — Qingzhang Zhou
*Assistant Examiner* — Kevin Edward Schwartz

(57) ABSTRACT

A nozzle and a process suitable for dispensing liquid foamable products, particularly useful with carbon dioxide blowing agents, the nozzle comprising a tubular exit zone having an inlet and an outlet; the tubular exit zone having an inner wall surface defining a passageway for dispensing having a centerline axis; the tubular exit zone further having a plurality of vanes attached to the inner wall surface parallel to the centerline axis with the vanes extending radially into the passageway for dispensing; the vanes having a length dimension, a thickness dimension, and a width dimension; and wherein the vanes do not connect or touch at the centerline of the passageway for dispensing.

19 Claims, 7 Drawing Sheets

(51) Int. Cl.

| | |
|---|---|
| ***B05B 7/04*** | (2006.01) |
| ***B05B 7/28*** | (2006.01) |
| ***B05D 1/02*** | (2006.01) |
| ***B29B 7/74*** | (2006.01) |

(52) U.S. Cl.
CPC .............. *B05D 1/02* (2013.01); *B29B 7/7419* (2013.01); *B05B 1/3402* (2018.08); *B05B 7/0408* (2013.01)

(58) Field of Classification Search
USPC .......................................................... 239/432
See application file for complete search history.

(56) References Cited

U.S. PATENT DOCUMENTS

| | | | | | |
|---|---|---|---|---|---|
| 4,487,368 | A * | 12/1984 | Clearman | B05B 3/0445 239/233 |
| 5,129,581 | A * | 7/1992 | Braun | B01F 25/4314 239/602 |
| 5,529,245 | A * | 6/1996 | Brown | B29B 7/7438 239/487 |
| 5,779,158 | A * | 7/1998 | Baker | A62C 31/12 239/425.5 |
| 6,021,961 | A | 2/2000 | Brown | |
| 6,375,096 | B1 | 4/2002 | Rashidi | |
| 7,220,457 | B2 * | 5/2007 | Anderson | B05B 7/0861 239/406 |
| 7,367,518 | B2 * | 5/2008 | Tanigaki | B05B 1/042 239/592 |
| 7,717,357 | B2 | 5/2010 | Gantenbein et al. | |
| 7,913,937 | B2 * | 3/2011 | Kioi | B05B 1/3402 239/592 |
| 8,104,650 | B2 * | 1/2012 | Lang | B05B 11/1097 222/190 |
| 9,511,381 | B2 | 12/2016 | Takahashi | |
| 10,322,385 | B2 | 6/2019 | Schulz et al. | |
| 11,103,889 | B2 * | 8/2021 | Foshag | B05B 1/042 |
| 2009/0302072 | A1 * | 12/2009 | Lang | B05B 11/1087 222/571 |
| 2012/0234947 | A1 * | 9/2012 | Takahashi | B65D 83/28 428/33 |
| 2016/0175788 | A1 * | 6/2016 | Schulz | B01F 23/235 366/336 |
| 2017/0197223 | A1 * | 7/2017 | Otoguro | B05B 7/005 |
| 2017/0209724 | A1 * | 7/2017 | Williams | A62C 31/05 |
| 2017/0341090 | A1 * | 11/2017 | Cameron | B05B 1/044 |
| 2018/0126404 | A1 * | 5/2018 | Foshag | B05B 1/042 |

FOREIGN PATENT DOCUMENTS

| | | | |
|---|---|---|---|
| WO | 96/00130 | A1 | 1/1996 |
| WO | 2009/146999 | A1 | 12/2009 |

* cited by examiner

DISPENSING NOZZLE HAVING A TUBULAR EXIT ZONE COMPRISING VANES

BACKGROUND OF THE INVENTION

Field of the Invention

This invention relates to improved dispensing nozzles suitable for applying spray foams and devices comprising the same, and relates particularly to satisfactorily applying spray foams in an environmentally-friendly manner. The dispensing nozzles are especially suitable for applying spray foams using carbon dioxide blowing agents, and can be used with two component spray foams.

Description of Related Art

Many existing blowing agents used in the dispensing and frothing of one and two component spray foams, particularly two component low pressure (TCLP) spray foams, are undesirable due to their high global warming potential (GWP) properties. Such undesirable blowing agents are primarily hydrofluorocarbon (HFC) based. Low GWP hydrofluoro-olefins (HFO) alternatives have been considered as potential replacements for HFC blowing agents. However, it has been found that HFO alternatives can react with catalysts used in some spray foams, degrading the foam performance and possibly even posing industrial hygiene concerns.

A more desirable blowing agent is carbon dioxide ($CO_2$); however, $CO_2$ has its own challenges when used to dispense foams. Carbon dioxide is less soluble than either HFCs or HFOs in foam-making chemicals. This means a lower amount of the blowing agent ($CO_2$) is present in the foam-making chemicals, which results in less frothing of the dispensed foam. Therefore, the use of $CO_2$ as a blowing agent results in a foam mixture that sprays with larger droplets and has more liquid than foam mixtures sprayed with HFC or HFO alternatives. Thus, the dispensed foam mixture tends to spray in a concentrated stream with splattering rather than a well distributed misty spray pattern.

What is needed is a nozzle, suitable for dispensing liquid foamable products, having features that improve the spray pattern of the foam mixture when applied to a surface. Such nozzles are especially desirable when environmentally-friendly but perhaps less than ideal blowing agents such as $CO_2$ are used, and especially useful for the application of two component spray foams.

BRIEF SUMMARY OF THE INVENTION

This invention relates to a nozzle suitable for dispensing liquid foamable products, the nozzle comprising a tubular exit zone having an inlet and an outlet; the tubular exit zone having an inner wall surface defining a passageway for dispensing, the passageway having a centerline axis; the tubular exit zone further having a plurality of vanes attached to the inner wall surface parallel to the centerline axis with the vanes extending radially into the passageway for dispensing; the vanes having a length having a length dimension, a thickness having a thickness dimension, and a width having a width dimension, the thickness dimension being smaller than the width dimension, and the width dimension being smaller than the length dimension; the length dimension being a distance the vane contacts the inner wall surface parallel to the centerline axis, and the thickness dimension being an effective thickness of the vane at the inner wall surface perpendicular to the centerline axis; and the width dimension being a distance from the inner wall surface that the vane extends into the passageway for dispensing; and wherein the vanes do not connect or touch at the centerline of the passageway for dispensing.

This invention also relates to a process for dispensing liquid foamable products with a nozzle comprising a tubular exit zone having an inlet and an outlet, comprising the steps of:

a) supplying a liquid foamable product comprising at least one blowing agent to the inlet of the tubular exit zone, the tubular exit zone having an inner wall surface defining a passageway for dispensing, the passageway having a centerline axis; the tubular exit zone further having a plurality of vanes attached to the inner wall surface parallel to the centerline axis with the vanes extending radially into the passageway for dispensing; the vanes having a length having a length dimension, a thickness having a thickness dimension, and a width having a width dimension, the thickness dimension being smaller than the width dimension, and the width dimension being smaller than the length dimension;

the length dimension being a distance the vane contacts the inner wall surface parallel to the centerline axis, and the thickness dimension being an effective thickness of the vane at the inner wall surface perpendicular to the centerline axis; and the width dimension being a distance from the inner wall surface that the vane extends into the passageway for dispensing; and wherein the vanes do not connect or touch at the centerline of the passageway for dispensing; and b) dispensing the liquid foamable product from the outlet of the tubular exit zone.

DETAILED DESCRIPTION OF THE INVENTION

Figure 4:
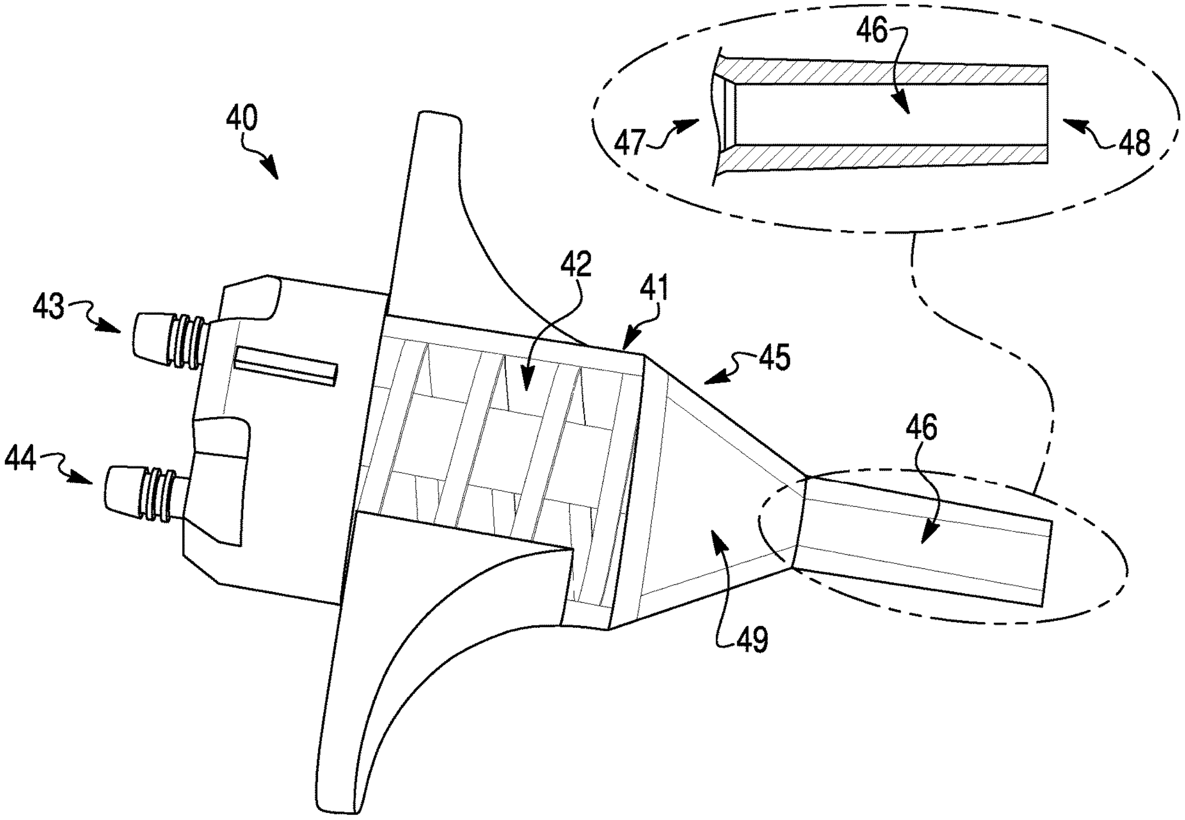
FIG. 4 is an illustration of a general depiction of a dispensing nozzle having tubular exit zone of the prior art that is essentially a hollow tube.

FIG. 4 provides a general depiction of a prior art dispensing nozzle 40 that has been referred to as a "mixing and dispensing nozzle" or an "anti-crossover or crossover-resistant nozzle" (in U.S. Pat. No. 6,021,961 to Brown); or a "mixing device" (in U.S. Pat. No. 10,322,385 to Schulz et al.). Both the "mixing and dispensing nozzle" and the "mixing device" are designed to be the dispensing nozzle used in a spray gun, the spray gun having a gun body, a handle, a trigger, and other associated parts useful in the spray gun for spraying foams. The dispensing nozzle 40 shown in FIG. 4 is useful in combining, mixing, and then dispensing at least two components in what is known as two-component spray foams. Conventionally, two-component spray foams typically are made from combining an "A-Component" and a "B-Component.

As shown in FIG. 4, the dispensing nozzle 40 has a housing 41 that defines a chamber 42, which is typically a mixing chamber that can have various internal parts to facilitate the mixing of the components. The dispensing nozzle further has an entrance 43 for feeding the A-Component into the mixing chamber, and a separate entrance 44 for feeding the B-Component into the mixing chamber, and there could be other entrances (not shown) for other materials if desired. The housing 41 and the chamber 42 are generally cylindrical or elongated in shape with the entrances 43 and 44 for feeding on one end and an exit opening on an opposing end 45. The dispensing nozzle further has a tubular exit zone 46 having an inlet 47 and an outlet 48. In the particular dispensing nozzle depicted in FIG. 4 the inlet 47 of the tubular exit zone 46 is connected to the housing 41 via a transition 49 having a generally trapezoidal shape. FIG. 4 further provides a detail of the tubular exit zone 46 of the prior art. As shown in the detail, the tubular exit zone is essentially a hollow tube.

It has been found that when dispensing nozzles such as those depicted in FIG. 4 were used to spray foams using certain gaseous blowing agents such as $CO_2$, the foam mixture was dispensed as a concentrated stream of unacceptably large liquid droplets rather than a well-distributed spray pattern of more mist-like droplets.

Further, it was unexpectantly found that modifying the outlet of the tubular exit zone of the dispensing nozzle to simultaneously increase the shear on the foamable mixture while dividing the foamable mixture into separate streams reduced the droplet size, increased the frothing of the foam mixture, and improved the distribution of the sprayed droplets in the intended spray pattern.

Therefore, this invention relates to a nozzle suitable for dispensing liquid foamable products, the nozzle comprising a tubular exit zone having an inlet and an outlet; the tubular exit zone having an inner wall surface defining a passageway for dispensing, the passageway having a centerline axis; the tubular exit zone further having a plurality of vanes attached to the inner wall surface parallel to the centerline axis with the vanes extending radially into the passageway for dispensing; the vanes having a length having a length dimension, a thickness having a thickness dimension, and a width having a width dimension, the thickness dimension being smaller than the width dimension, and the width dimension being smaller than the length dimension; the length dimension being a distance the vane contacts the inner wall surface parallel to the centerline axis, and the thickness dimension being an effective thickness of the vane at the inner wall surface perpendicular to the centerline axis; and the width dimension being a distance from the inner wall surface that the vane extends into the passageway for dispensing; and wherein the vanes do not connect or touch at the centerline of the passageway for dispensing.

The words "nozzle" and "dispensing nozzle" are used interchangeably herein. Further, it is not intended that the nozzles described herein to be limited to the "mixing and dispensing nozzle" or an "anti-crossover or crossover-resistant nozzle" that is used with a spray gun, however, this is a preferred embodiment. It is contemplated that the principles described herein relating to a tubular exit zone having a plurality of vanes could be used at the exit of essentially any device used to spray foam; therefore, the words "nozzle" or "dispensing nozzle" are intended to include essentially any device suitable for spraying any foam composition that further has an exit passageway including a tubular exit zone having a plurality of vanes as disclosed or arranged herein.

Figure 1:
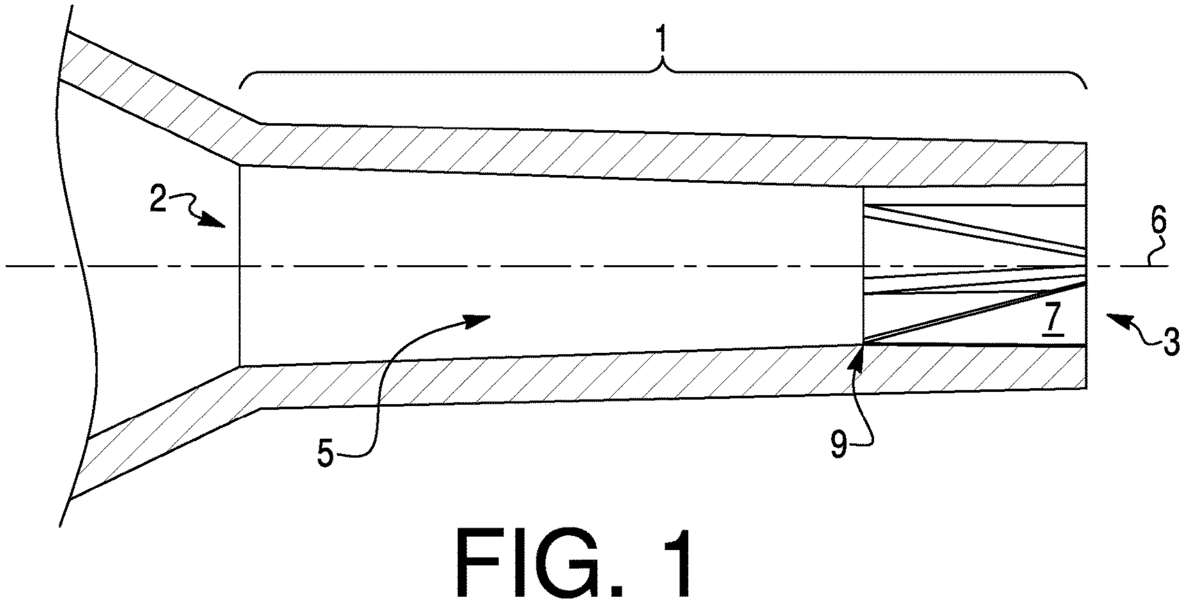
FIG. 1 is an illustration of one version of a tubular exit zone that simultaneously increases the shear on the foamable mixture while dividing the foamable mixture into separate streams.
Figure 2:
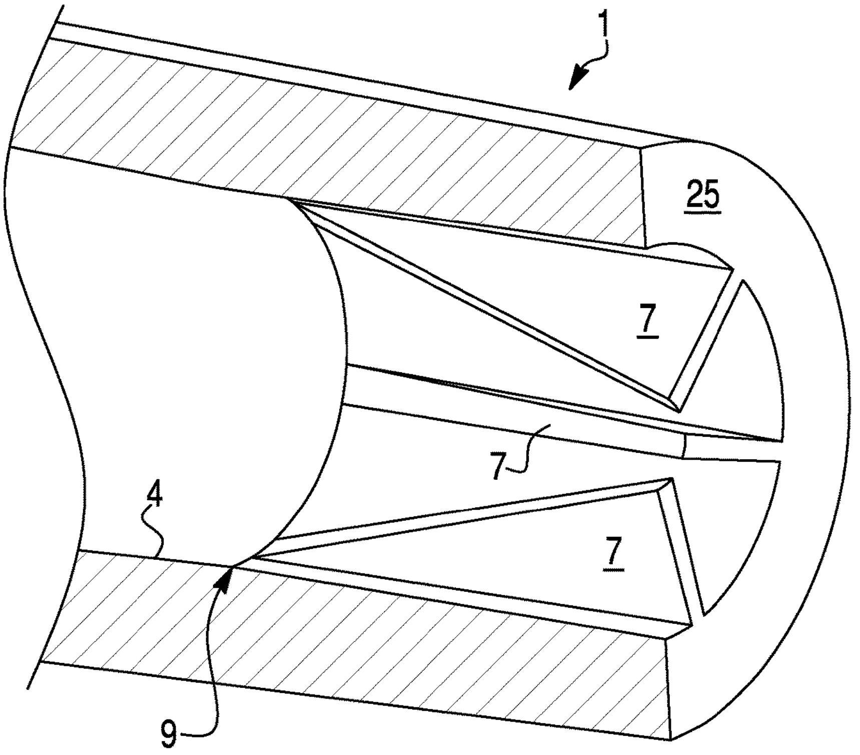
FIG. 2 is a detail of the tubular exit zone of FIG. 1 illustrating the embodiment wherein the tubular exit zone outlet ends at the exit face of the dispensing nozzle and the vanes end at the plane of the exit face, that is, they are flush with the plane of the exit face; and the width dimension of each vane has a maximum value at the outlet for the tubular exit zone, or at the plane of the exit face, and the width dimension decreases in value along the vane in the direction away from the exit face parallel to length of the vane; and the thickness dimension decreases in value along the vane in the direction away from the exit face parallel to length of the vane.

One version of a tubular exit zone that simultaneously increases the shear on the foamable mixture while dividing the foamable mixture into separate streams is shown in FIGS. 1 & 2. The nozzle (not fully shown) comprises a tubular exit zone 1 having an inlet 2 and an outlet 3. The tubular exit zone has an inner wall surface 4 defining a hollow passageway for dispensing 5 through the tubular exit zone, the passageway having a centerline axis 6. The tubular exit zone further has a plurality of vanes 7 attached to the inner wall surface parallel to the centerline axis with the vanes extending radially into the passageway for dispensing 5. The tubular exit zone can have a constant diameter throughout or can narrow from a larger diameter at the inlet and a slightly smaller diameter at the exit; or as shown in FIGS. 1 & 2, the diameter or the tubular exit zone can decrease slightly from the inlet 2 to the starting point of the vanes 9, and then the diameter increases from the starting point of the vanes 9 to the outlet 3. In some preferred embodiments, the diameter does not vary from the inlet to the outlet by more than 5%.

Each vane 7 has a length, a thickness, and a width. Additionally, the thickness dimension is smaller than the width dimension, and the width dimension is smaller than the length dimension. FIG. 2 is a cross sectioned angled view of the outlet 3 of a 6-vaned tubular exit zone 1 cut axially along the centerline axis, showing three of the vanes starting at point 9 in the tubular passageway.

Figure 3:
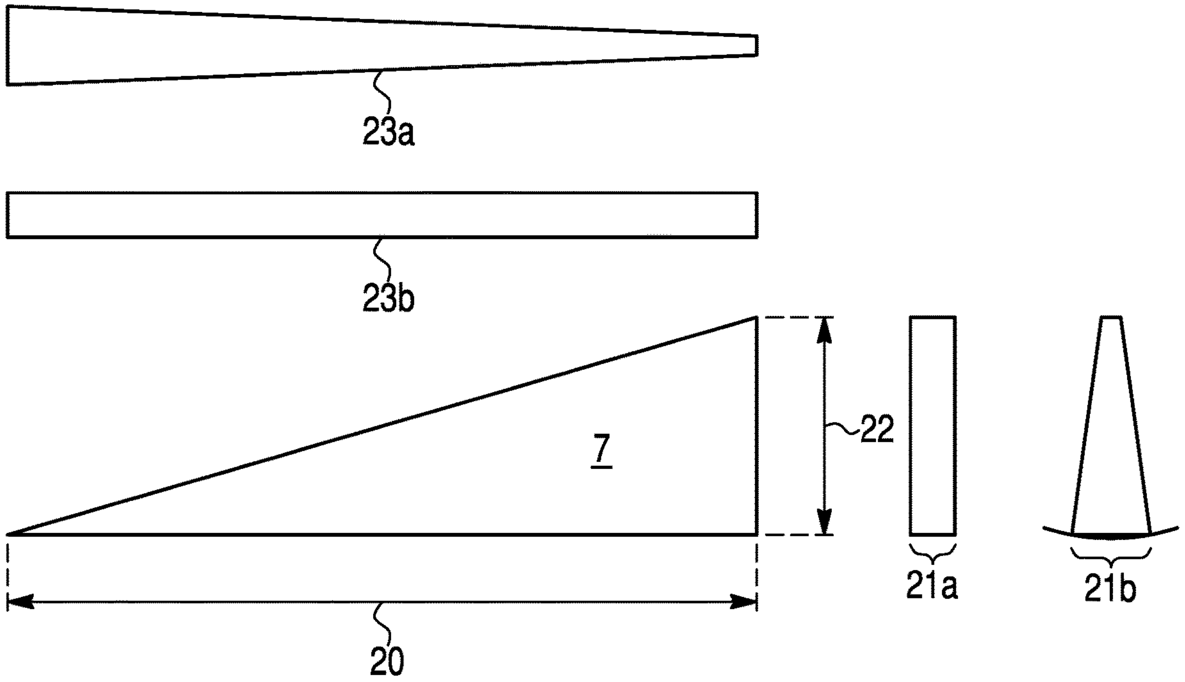
FIG. 3 is an illustration of a triangular vane having a length, a thickness, and a width, illustrating the associated length dimension, thickness dimension, and width dimension, including various vane thickness embodiments.

As shown in FIG. 2 and in detail FIG. 3, preferably the vane 7 is triangular in shape with the long edge of the vane being parallel with the centerline axis and further contacting the inner wall surface 4. The vane length is characterized by a vane length dimension; the length dimension being defined herein as the distance 20 the vane contacts the inner wall surface parallel to the centerline axis. Preferably, all the vanes have the same length dimension.

The vane thickness is characterized by a thickness dimension; the thickness dimension being defined herein as the effective thickness of the vane at the inner wall surface perpendicular to the centerline axis. If the thickness of the vane varies along the length of the vane at the inner wall surface, the effective thickness of the vane is therefore considered to be the maximum thickness dimension of the vane at the inner wall surface along the length of the vane. As shown in FIG. 3, the vane thickness dimension 21*a* is shown for a vane having a rectangular end and thus having the same thickness at the inner wall surface as radially into the passageway. Also shown in FIG. 3 is one alternative thickness dimension 21*b* shown for a vane having a trapezoidal end and thus having a larger and different thickness at the inner wall surface, with the vane thickness being progressively less radially away from the inner wall surface into the passageway. In this instance, the thickness dimension is the distance shown in FIG. 3 at the inner wall surface perpendicular to the centerline axis. For avoidance of doubt, since the inner wall surface is generally curved, the effective thickness is essentially the straight-line distance through the vane at the point the vane contacts the inner wall as shown in FIG. 3 for 21*b*.

In some embodiments, the thickness dimension of each vane increases along the length of the vane from a minimum value at the outlet for the tubular exit zone. One such illustration of this embodiment is shown in FIG. 3, wherein 23*a* is a top view of the triangular vane 7, illustrating the vane that has a trapezoidal appearance when viewed radially from the centerline axis. In this instance, the vane has a minimum thickness dimension at the tubular exit zone outlet (or the exit face 25) and a maximum thickness dimension at point 9 in the tubular passageway where the vane ends. In a further version of this embodiment, while the thickness dimension varies along the length of the vane, the vane has the same thickness dimension at the inner wall surface as radially into the passageway; that is, the vane has a combination of the features of 23*a* combined with the features of 21*a*. Still another version is the combination of embodiments embraced by the combination of 23*a* with 21*b*. Also shown in FIG. 3 is alternate embodiment 23*b*, a top view of the triangular vane 7, illustrating the vane has a rectangular appearance when viewed radially from the centerline axis; in other words the thickness dimension does not vary along the length of the vane. Again, in a further version of this embodiment, the thickness dimension is the same along the length of the triangular vane 7 and the vane has the same thickness dimension at the inner wall surface as radially into the passageway; which is the combination of 23*b* with the features of 21*a*. Still another version is the combination of embodiments embraced by the combination of 23*b* with 21*b*.

The vane width is characterized by a width dimension; the width dimension being defined herein as the maximum distance 22 from the inner wall surface that the vane extends into the passageway for dispensing. Preferably each vane is triangular shaped along its length, with the width varying linearly from a maximum at the tubular exit zone outlet (or the exit face 25) to a minimum at the opposing end of the vane (point 9 in the tubular passageway). The vanes further do not connect or touch at the centerline of the passageway for dispensing. Preferably, the vanes do not extend radially into the passageway as far as the centerline axis.

Preferably, all the vanes have a similar shape and dimensions, that is, all the vanes have the same combination of width, thickness, and length dimensions.

The nozzle suitable for dispensing liquid foamable products comprises a tubular exit zone having a plurality of vanes attached to the inner wall surface parallel to the centerline axis with the vanes extending radially into the passageway for dispensing. By "plurality" it is meant 2 or more vanes. In some embodiments, the nozzle comprises a tubular exit zone having 3 or more vanes. In some other embodiments, the nozzle comprises a tubular exit zone having 5 to 8 vanes; in some other embodiments, the nozzle comprises a tubular exit zone having 5 to 10 vanes. It is believed that 10 is a practical maximum for most foamable compositions.

The nozzle suitable for dispensing liquid foamable products comprises a tubular exit zone having an inlet and an outlet, and in some embodiments the outlet for the tubular exit zone is an exit face of the dispensing nozzle. The vanes are preferably present in the tubular exit zone extending from the outlet end of the tubular exit zone into the tubular exit zone, the vanes ending some distance (parallel to the centerline) between the tubular exit zone inlet and outlet. Generally the vanes will extend in from outlet (or the exit face 25) into the tubular exit zone a distance parallel to the centerline that is no more than about one third the total length of the tubular exit zone, and preferably the vanes will extend no more than about one fourth the total length of the tubular exit zone. In a preferred embodiment illustrated in FIGS. 1 & 2, the distance parallel to the centerline is measured from the outlet (or the exit face 25) to a point 9 in the tubular passageway where the vanes end. Preferably there are no vanes positioned near or beginning at the inlet of the tubular exit zone; rather, the vanes are preferably only present near the outlet of the of the tubular exit zone. Further, in many instances it is desirable for the vanes to end flush with the exit face of the dispensing nozzle. Said another way, it is desirable for the vanes to not extend outside the outlet of the tubular exit zone, but to end flush with the outside surface of the tubular exit zone outlet as is shown in FIGS. 1 & 2; the tubular exit zone outlet 3 ends at the exit face 25, and the vanes 7 end at the plane of the exit face, that is, they are flush with the plane of the exit face.

In some embodiments, such as shown in FIGS. 1 & 2, the width dimension of each vane has a maximum value at the outlet for the tubular exit zone, or at the plane of the exit face, and decreases in value along the length of the vane to a point 9 in the tubular passageway.

In some embodiments, the thickness dimension of each vane has a maximum value at the inner wall surface and decreases radially into the passageway for dispensing as shown in FIG. 3 as 21*b*. In some other embodiments, the thickness dimension of each vane does not vary from the inner wall surface into the passageway for dispensing as shown in FIG. 3 as 21*a*.

In some preferred embodiments, the vanes are symmetrically distributed radially about the centerline of the passageway for dispensing. However, in some embodiments the vanes are unsymmetrically distributed radially about centerline of the passageway for dispensing.

While the figures depict the vanes being located in the tubular exit zone with the vane length-wise being strictly parallel to the centerline axis and the vane width-wise being strictly radial in relation to the centerline axis of the tubular exit zone, if desirable, the vanes could be positioned offset from a truly parallel or radial position in relation to the centerline axis of the tubular exit zone if desired, as long as spray performance was not affected.

The devices suitable for dispensing liquid foamable products that could comprise nozzles having the tubular exit zone with vanes described herein include spray parts known as "mixing and dispensing nozzles" or an "anti-crossover or crossover-resistant nozzles", or even "mixing devices". For example, the tubular exit zone could be attached to the exit of a mixing device or other nozzles could be modified to include the tubular exit zone described herein.

One suitable dispensing nozzle is one that combines, mixes, and then dispenses a foamable mixture of at least two components in what is known as two-component spray foams. Accordingly, in one embodiment a mixing chamber is attached to the inlet of the tubular exit zone, as shown in dispensing nozzle 50 for two-component spray foams in FIGS. 5, 6, & 7 that has been modified to include the tubular exit zone with vanes. The dispensing nozzle comprises a housing 51 that defines a chamber 52, which is typically a mixing chamber that can have various internal parts to facilitate the mixing of the components. The dispensing nozzle further has an entrance 53 for feeding the A-Component into the mixing chamber, and a separate entrance 54 for feeding the B-Component into the mixing chamber, and there could be other entrances (not shown) for other materials such as other foam components or blowing agents, if desired. The housing 51 and the chamber 52 are generally cylindrical or elongated in shape with the entrances 53 and 54 for feeding on one end and an exit opening 55 on an opposing end. The dispensing nozzle further has a transition piece 59 to the tubular exit zone 56 having an inlet 57 and an outlet 58 with vanes in the outlet end of the tubular exist zone.

Figure 5:
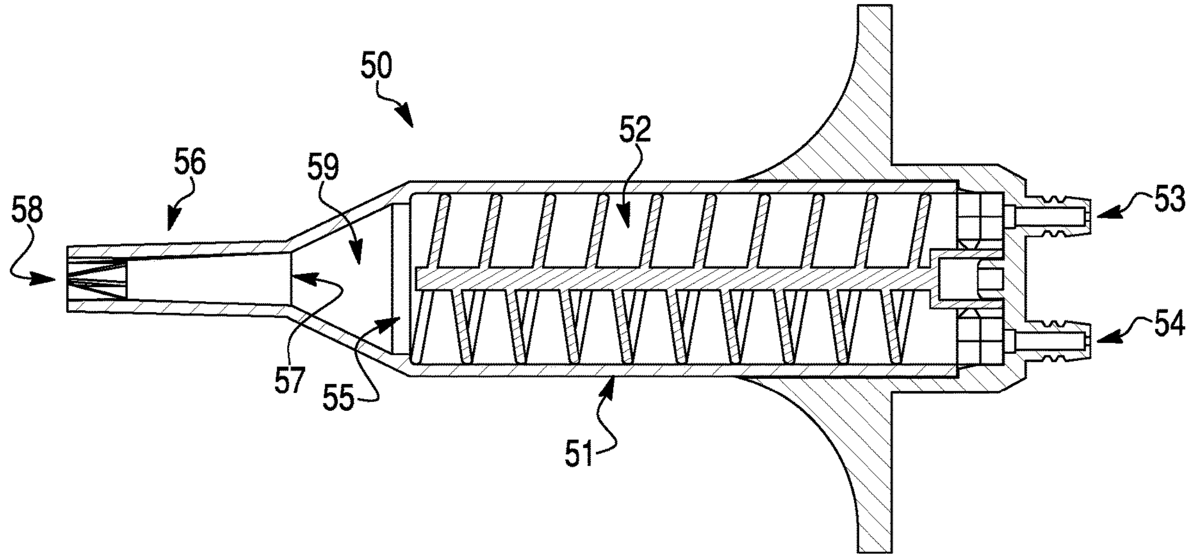
FIG. 5 is an illustration of the cross section of one embodiment of a dispensing nozzle wherein a mixing chamber suitable for two-component spray foams is attached to the inlet of a tubular exit zone with vanes.
Figure 6:
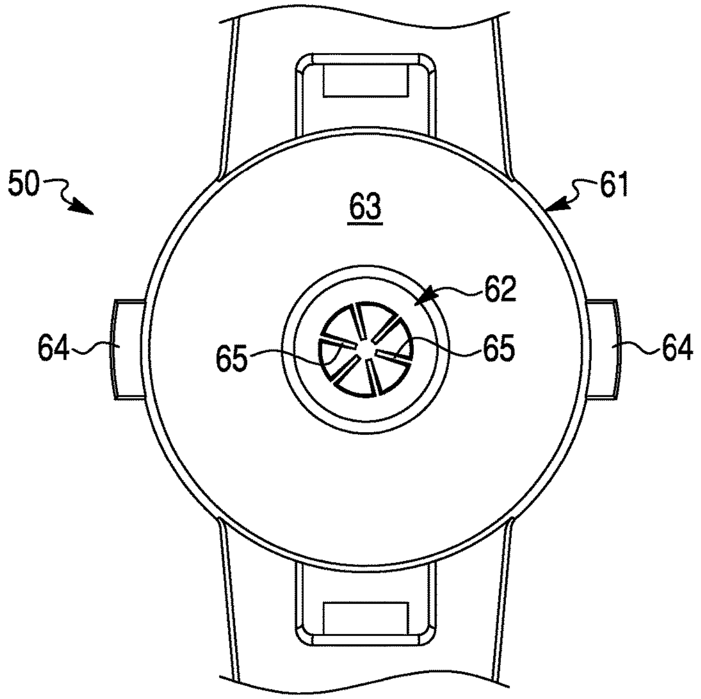
FIG. 6 is an end-on view of a dispensing nozzle of FIG. 5 showing an embodiment having 6 vanes symmetrically distributed radially about the centerline of the passageway for dispensing.

FIG. 6 is an end-on view of the dispensing nozzle 50 for two-component spray foams. as shown in FIG. 5. The dispensing nozzle housing 61 is shown connected to the tubular exit zone 62 via transition piece 63. The dispensing nozzle further has flanges 64 for mounting the nozzle in a spray gun. The tubular exit zone has 6 vanes 65 symmetrically distributed radially about the centerline of the passageway for dispensing. The vanes extend into the passageway for dispensing but do not connect or touch at the centerline of the passageway for dispensing. This leaves a hollow straight-line zone at the centerline of the passageway for dispensing the foamable material, and the vanes further divide the foamable material into separate streams. This arrangement of vanes with a hollow straight-line dispensing zone at the centerline of the passageway simultaneously divides the foamable mixture into separate streams while also providing additional shear into the foamable mixture at the outlet of the tubular exit zone.

Figure 7:
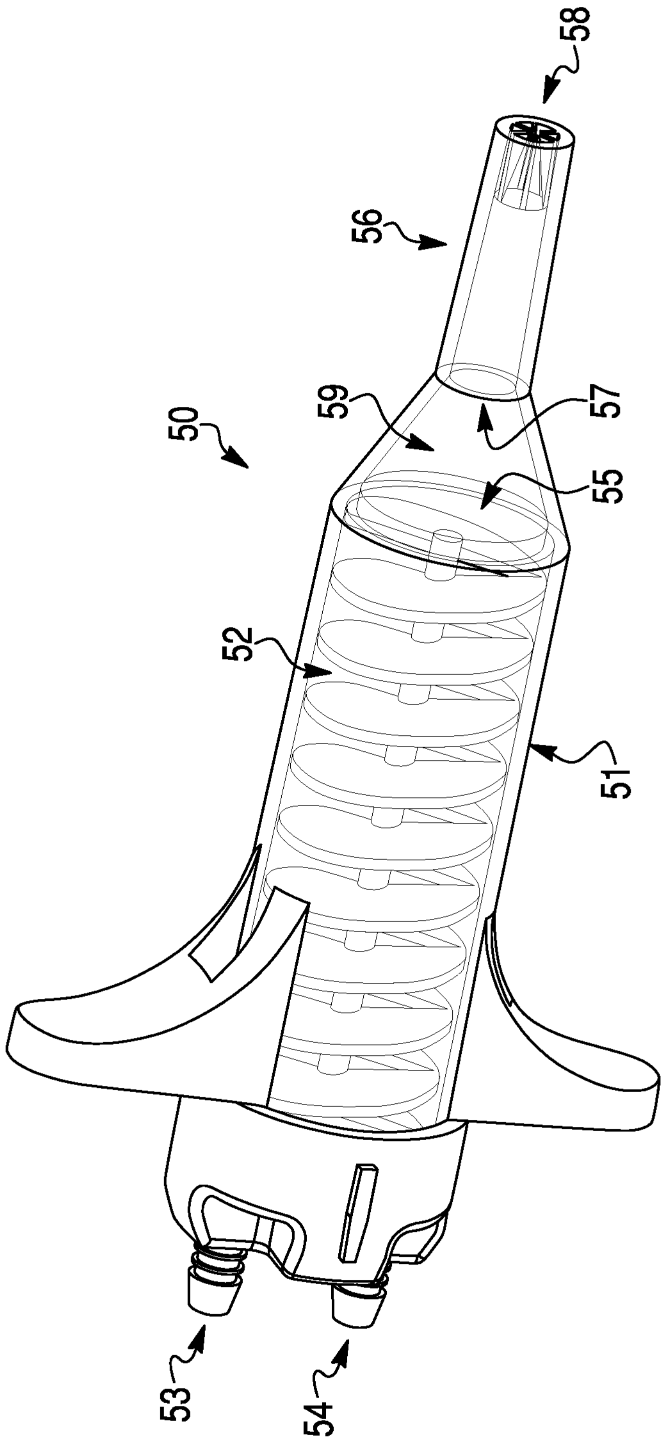
FIG. 7 is a perspective view of a dispensing nozzle of FIGS. 5 & 6 having a relatively transparent or see-through housing.
Figure 8:
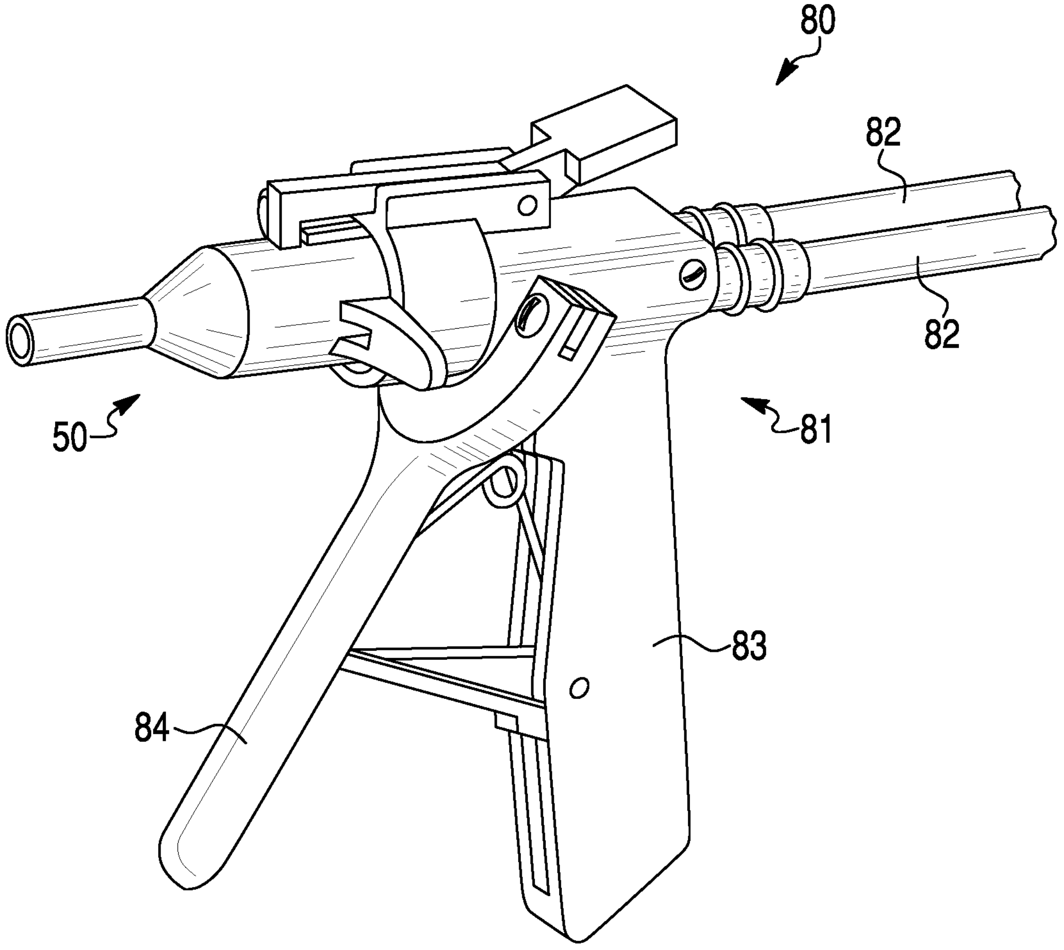
FIG. 8 is an illustration of one type of spray gun that could include the dispensing nozzle having a tubular exit zone with vanes.

Useful dispensing nozzles including the tubular exit zone with vanes include any number of "spray gun nozzles" that could comprise a tubular exit zone with vanes described herein. One such dispensing device in the form of a spray gun 80 is shown in FIG. 8; it is useful in combining, mixing, and then dispensing at least two components in what is known as two-component spray foams. As shown in the FIG. 8, as one example, the spray gun 80 typically comprises a gun body 81 having one or more entrances 82 for the components to be sprayed, a handle 83, and a trigger 84. Attached to the spray gun 80 is the dispensing nozzle 50 for two-component spray foams as shown in FIGS. 5, 6, & 7 that includes the tubular exit zone with vanes, although for simplicity the vanes and other internal details of dispensing nozzle 50 are not shown or reproduced in FIG. 8. Other such devices are possible.

This invention also relates to a process for dispensing liquid foamable products with a nozzle comprising a tubular exit zone having an inlet and an outlet, comprising the steps of:

a) supplying a liquid foamable product comprising at least one blowing agent to the inlet of the tubular exit zone, the tubular exit zone having an inner wall surface defining a passageway for dispensing, the passageway having a centerline axis; the tubular exit zone further having a plurality of vanes attached to the inner wall surface parallel to the centerline axis with the vanes extending radially into the passageway for dispensing; the vanes having a length having a length dimension, a thickness having a thickness dimension, and a width having a width dimension, the thickness dimension being smaller than the width dimension, and the width dimension being smaller than the length dimension;

the length dimension being a distance the vane contacts the inner wall surface parallel to the centerline axis, and the thickness dimension being an effective thickness of the vane at the inner wall surface perpendicular to the centerline axis; and the width dimension being a distance from the inner wall surface that the vane extends into the passageway for dispensing; and wherein the vanes do not connect or touch at the centerline of the passageway for dispensing; and b) dispensing the liquid foamable product from the outlet of the tubular exit zone.

In a preferred embodiment, the process uses an environmentally-friendly blowing agent such as carbon dioxide. In some embodiments, the process further includes a step, prior to step a), of mixing more than one component to make a liquid foamable product, preferably mixing a two component foamable product and a blowing agent. Preferably the mixing is accomplished in the nozzle prior to the inlet of the tubular exit zone.

All of the features and elements of the tubular exit zone described herein can be used in the process for dispensing liquid foamable products using a nozzle comprising the said tubular exit zone. Namely, the tubular exit zone has 2 or more vanes attached to the inner wall surface parallel to the centerline axis with the vanes extending radially into the passageway for dispensing. In some embodiments, the nozzle comprises a tubular exit zone having 3 or more vanes. In some other embodiments, the nozzle comprises a tubular exit zone having 5 to 8 vanes; in other embodiments, the nozzle comprises a tubular exit zone having 5 to 10 vanes. The process can use a dispensing nozzle comprising a tubular exit zone wherein the vanes are symmetrically distributed radially about the centerline of the passageway for dispensing. Alternatively, the process can use a dispensing nozzle comprising a tubular exit zone wherein the vanes are unsymmetrically distributed radially about the centerline of the passageway for dispensing. Further, while the figures depict the vanes being located in the tubular exit zone with the vane length-wise being strictly parallel to the centerline axis and the vane width-wise being strictly radial in relation to the centerline axis of the tubular exit zone, if desirable, the vanes could be positioned offset from a truly parallel or radial position in relation to the centerline axis of the tubular exit zone if desired, as long as spray performance was not affected.

As previously discussed herein, in one embodiment of the process using a dispensing nozzle comprising a tubular exit zone, each vane is triangular shaped with the width dimension of each vane having a maximum value at the outlet for the tubular exit zone and decreasing linearly along the length of the vane to a minimum at the opposing end of the vane. Likewise, in another embodiment of the process using a dispensing nozzle comprising a tubular exit zone, the thickness dimension of each vane in the nozzle has a maximum value at the inner wall surface and decreases radially into the passageway for dispensing.

In one preferred embodiment of the process using a dispensing nozzle comprising a tubular exit zone, each of the vanes have, as shown in FIGS. 1, 2, & 3, a minimum thickness dimension at the tubular exit zone outlet (or the exit face 25) and a maximum thickness dimension at point 9 in the tubular passageway where the vane ends. One such illustration of this embodiment is shown in FIG. 3, wherein 23*a* is a top view of the triangular vane 7, illustrating the vane that has a trapezoidal appearance when viewed radially from the centerline axis. In this instance, the vane has a minimum thickness dimension at the tubular exit zone outlet (or the exit face 25) and a maximum thickness dimension at point 9 in the tubular passageway where the vane ends.

In a further version of this preferred embodiment, while the thickness dimension varies along the length of the vane, the vane has the same thickness dimension at the inner wall surface as radially into the passageway; that is, the vane has a combination of the features of 23*a* combined with the features of 21*a* as shown in FIG. 3.

In another version of this embodiment, while the thickness dimension varies along the length of the vane, the vane thickness dimension also decreases from the inner wall surface radially into the passageway; that is, the vane has a trapezoidal shape when viewed end-on as in FIG. 6. This is a combination of the features of 23*a* combined with the features of 21*b* as shown in FIG. 3.

Further, it is generally preferred that all the vanes have the same dimensions and shape.

As previously discussed herein, in one embodiment of the process using a dispensing nozzle comprising a tubular exit zone, the dispensing nozzle further comprises a mixing chamber attached to the inlet of the tubular exit zone. Also, in still another embodiment of the process using a dispensing nozzle comprising a tubular exit zone the outlet for the tubular exit zone of the nozzle is an exit face of the nozzle.

EXAMPLES

A two-component foam was sprayed onto a flat horizontal substrate using a $CO_2$ blowing agent using as a control a spray gun having a dispensing nozzle that had a hollow tubular exit zone without vanes, and then again with a spray gun having a dispensing nozzle as illustrated in FIGS. 5, 6, & 7 with six vanes. The foamable chemicals, the substrate, and the ambient temperatures were all between 70 and 80 degrees Fahrenheit. The end of the nozzle was 18-24 inches from the substrate.

Figure 9:
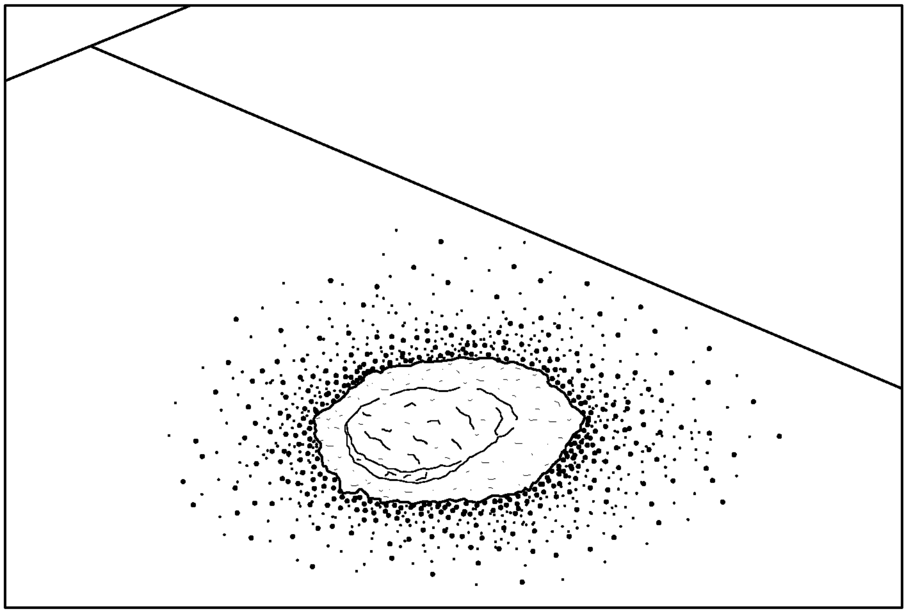
FIG. 9 is an illustration of the undesirable spray pattern made from the combination of a two-component foam with a $CO_2$ blowing agent, using a dispensing nozzle that has a tubular exit zone that is essentially a hollow tube without any vanes.

FIG. 9 is an illustration of the undesirable spray pattern made from the combination of a two-component foam with a $CO_2$ blowing agent, using a dispensing nozzle that has a tubular exit zone that is essentially a hollow tube without any vanes. The resulting foam piled up in the center, had unacceptable splatter, visually provided a non-uniform spray pattern, and had poor adhesion to the substrate.

Figure 10:
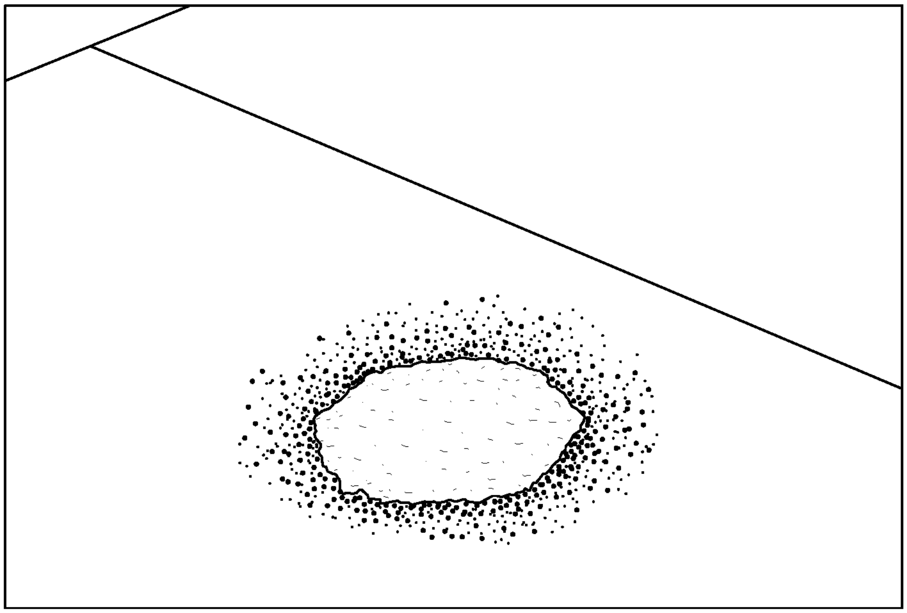
FIG. 10 is an illustration of the desirable spray pattern made from the combination of a two-component foam with a $CO_2$ blowing agent, using a dispensing nozzle that has a tubular exit zone having vanes that are symmetrically distributed radially in the tubular exit zone.

FIG. 10 is an illustration of the desirable spray pattern made from the combination of a two-component foam with a $CO_2$ blowing agent, using a dispensing nozzle that has a tubular exit zone having vanes that are symmetrically distributed radially in the tubular exit zone. The resulting foam was visibly more uniformly distributed, had little splatter, visually provided a uniform spray pattern, and exhibited improved adhesion to the substrate.

What is claimed is:

1. A nozzle suitable for dispensing liquid foamable products, the nozzle comprising a tubular exit zone having an inlet and an outlet, and a length;

wherein the tubular exit zone of the nozzle consists of a tubular passageway having an inlet end and an outlet end, with a plurality of vanes in the outlet end;

the tubular exit zone having an inner wall surface defining a hollow passageway for dispensing through the tubular exit zone, the passageway for dispensing having a centerline axis;

the tubular exit zone further having the plurality of vanes attached to the inner wall surface parallel to the centerline axis with the vanes extending radially into the passageway for dispensing;

the vanes having a length having a length dimension, a thickness having a thickness dimension, and a width having a width dimension, the thickness dimension being smaller than the width dimension, and the width dimension being smaller than the length dimension;

the length dimension being a distance the vane contacts the inner wall surface parallel to the centerline axis, the thickness dimension being an effective thickness of the vane at the inner wall surface perpendicular to the centerline axis, and the width dimension being a distance from the inner wall surface that the vane extends into the passageway for dispensing; and wherein the vanes do not connect or touch at the centerline axis of the passageway for dispensing, wherein the vanes extend in from the outlet into the tubular exit zone a distance parallel to the centerline that is no more than one third the length of the tubular exit zone, wherein the width dimension of each vane has a maximum value at the outlet for the tubular exit zone and linearly decreases along the entire length of the vane, and the outlet for the tubular exit zone is an exit face of the nozzle.

2. The nozzle of claim 1 having 3 or more vanes.

3. The nozzle of claim 2 having 5 to 10 vanes.

4. The nozzle of claim 1 wherein the vanes are symmetrically distributed radially about the centerline axis of the passageway for dispensing.

5. The nozzle of claim 1 wherein the vanes are unsymmetrically distributed radially about centerline axis of the passageway for dispensing.

6. The nozzle of claim 1 wherein the thickness dimension of each vane has a maximum value at the inner wall surface and decreases radially into the passageway for dispensing.

7. The nozzle of claim 1 wherein the thickness dimension of each vane does not vary from the inner wall surface into the passageway for dispensing.

8. The nozzle of claim 1 wherein the thickness dimension of each vane increases along the length of the vane from a minimum value at the outlet for the tubular exit zone.

9. The nozzle of claim 1 further comprising a mixing chamber attached to the inlet of the tubular exit zone.

10. A process for dispensing foamable products with a nozzle comprising a tubular exit zone having an inlet and an outlet, and a length, wherein the tubular exit zone of the nozzle consists of a tubular passageway having an inlet end and an outlet end, with a plurality of vanes in the outlet end; comprising the steps of:

a) supplying a liquid foamable product comprising at least one blowing agent to the inlet of the tubular exit zone, the tubular exit zone having an inner wall surface defining a hollow passageway for dispensing through the tubular exit zone, the passageway for dispensing having a centerline axis;

the tubular exit zone further having the plurality of vanes attached to the inner wall surface parallel to the centerline axis with the vanes extending radially into the passageway for dispensing;

the vanes having a length having a length dimension, a thickness having a thickness dimension, and a width having a width dimension, the thickness dimension being smaller than the width dimension, and the width dimension being smaller than the length dimension;

the length dimension being a distance the vane contacts the inner wall surface parallel to the centerline axis, the thickness dimension being an effective thickness of the vane at the inner wall surface perpendicular to the centerline axis, and the width dimension being a distance from the inner wall surface that the vane extends into the passageway for dispensing; and wherein the vanes do not connect or touch at the centerline axis of the passageway for dispensing, and wherein the vanes extend in from the outlet into the tubular exit zone a distance parallel to the centerline that is no more than one third the length of the tubular exit zone, wherein the width dimension of each vane has a maximum value at the outlet for the tubular exit zone and linearly decreases along the entire length of the vane, and the outlet for the tubular exit zone is an exit face of the nozzle; and b) dispensing the liquid foamable product from the outlet of the tubular exit zone.

11. The process of claim 10 wherein the nozzle has 3 or more vanes.

12. The process of claim 11 wherein the nozzle has 5 to 10 vanes.

13. The process of claim 10 wherein the nozzle has vanes symmetrically distributed radially about the centerline axis of the passageway for dispensing.

14. The process of claim 10 wherein the nozzle has vanes unsymmetrically distributed radially about the centerline axis of the passageway for dispensing.

15. The process of claim 10 wherein the thickness dimension of each vane in the nozzle has a maximum value at the inner wall surface and decreases radially into the passageway for dispensing.

16. The process of claim 10 wherein the thickness dimension of each vane in the nozzle does not vary from the inner wall surface into the passageway for dispensing.

17. The process of claim 10 wherein the thickness dimension of each vane increases along the length of the vane from a minimum value at the outlet for the tubular exit zone.

18. The process of claim 10 wherein the nozzle further comprises a mixing chamber attached to the inlet of the tubular exit zone.

19. The process of claim 10 wherein the blowing agent is carbon dioxide.

* * * * *